United States Patent
Elsherif et al.

(10) Patent No.: US 9,516,506 B2
(45) Date of Patent: Dec. 6, 2016

(54) INTERFERENCE MANAGEMENT FOR RADIO NETWORKS

(71) Applicant: FUJITSU LIMITED, Kawasaki-shi, Kanagawa (JP)

(72) Inventors: Ahmed Ragab Elsherif, Santa Clara, CA (US); Wei-Peng Chen, Fremont, CA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 14/027,063

(22) Filed: Sep. 13, 2013

(65) Prior Publication Data

US 2015/0078161 A1 Mar. 19, 2015

(51) Int. Cl.
| | |
|---|---|
| *H04W 16/14* | (2009.01) |
| *H04J 3/00* | (2006.01) |
| *H04W 16/04* | (2009.01) |
| *H04B 7/185* | (2006.01) |
| *H04W 84/04* | (2009.01) |

(52) U.S. Cl.
CPC ........... *H04W 16/04* (2013.01); *H04W 84/045* (2013.01)

(58) Field of Classification Search
CPC .. H04W 72/12; H04W 72/04; H04W 72/0453; H04W 16/14; H04L 5/0053
USPC ................... 370/329, 328; 455/450
See application file for complete search history.

(56) References Cited

U.S. PATENT DOCUMENTS

| | | | | |
|---|---|---|---|---|
| 8,320,313 | B1* | 11/2012 | Singh | H04W 24/02 370/329 |
| 2005/0243752 | A1* | 11/2005 | Brueck | H04W 52/343 370/317 |
| 2006/0064497 | A1* | 3/2006 | Bejerano et al. | 709/228 |
| 2010/0214943 | A1* | 8/2010 | Immendorf | H04W 24/00 370/252 |
| 2010/0222062 | A1* | 9/2010 | Chou | H04W 16/14 455/449 |
| 2010/0246538 | A1* | 9/2010 | Kravtsov | H04W 72/06 370/336 |
| 2011/0183678 | A1* | 7/2011 | Kerpez | H04W 24/06 455/450 |

(Continued)

OTHER PUBLICATIONS

V. Chandrasekhar, J. Andrews, and A. Gathere, "Femtocell Networks: a Survey," IEEE Comm. Magazine, vol. 46, No. 9, pp. 59-67, Sep. 2008.

(Continued)

*Primary Examiner* — Mohamed Kamara
*Assistant Examiner* — Will Lin
(74) *Attorney, Agent, or Firm* — Maschoff Brennan

(57) ABSTRACT

According to an aspect of an embodiment, a method of controlling radio resources includes calculating multiple sets of scaled load estimates based on a single set of initial load estimates associated with estimated radio resource loads of multiple base stations. Each of the sets of scaled load estimates includes the single set of initial load estimates scaled by one of multiple scale factors. The method further includes determining multiple objective function results. Each objective function result is based at least in part on a result of an objective function for an individual set of scaled load estimates of the multiple sets of scaled load estimates. The method further includes determining an operating set of radio resources for multiple base stations based at least in part on the multiple objective function results.

23 Claims, 4 Drawing Sheets

(56) References Cited

U.S. PATENT DOCUMENTS

| | | | | |
|---|---|---|---|---|
| 2012/0030734 | A1* | 2/2012 | Wohlert | H04L 63/101 726/4 |
| 2012/0230267 | A1* | 9/2012 | Sundaresan | H04W 72/06 370/329 |
| 2012/0317532 | A1* | 12/2012 | Caunegre | G06F 17/5072 716/118 |
| 2013/0115989 | A1* | 5/2013 | Yamazaki | H04W 16/08 455/507 |
| 2013/0143592 | A1* | 6/2013 | Brisebois | H04W 24/02 455/456.1 |
| 2014/0241179 | A1* | 8/2014 | Arulprakasam | H04W 24/08 370/252 |
| 2014/0254355 | A1* | 9/2014 | Soliman, Sr. | H04W 28/08 370/229 |
| 2014/0307552 | A1* | 10/2014 | Elsherif | H04W 36/14 370/235 |
| 2014/0354459 | A1* | 12/2014 | Caldwell | H03M 3/30 341/143 |

OTHER PUBLICATIONS

D. Lopez-Perez, G. Roche, A. Valcarce, A. Juttner, and J. Zhang, "Interference Avoidance and Dynamic Frequency Planning for WiMAX Femtocells Networks," in IEEE ICCS, Nov. 2008.

G. Gür, S. Bayhan, and F. Alagöz, "Cognitive femtocell networks: an overlay architecture for localized dynamic spectrum access," IEEE Wireless Communications, vol. 17, pp. 62-70, Aug. 2010.

Qualcomm, "Enterprise Multi-Femtocell Deployment Guideline", [Online]. Available: http://www.qualcomm.com/media/documents/files/qualcomm-research-enterprise-femtocell.pdf, Jun. 2011.

Y. Wu, J. Hai, and Z. Dongmei. "A Novel Coordinated Spectrum Assignment Scheme for Densely Deployed Enterprise LTE Femtocells." Vehicular Technology Conference (VTC Spring), 2012 IEEE 75th. IEEE, May 6-9, 2012.

"Technical Specification Group Services and System Aspects; Evolved Universal Terrestrial Radio Access (E-UTRA); FDD Home eNode B (HeNB) Radio Frequency (RF) requirements analysis (Release 11)," 3GPP TR 36.921 V11.0.0, Sep. 2012.

S. Sadr and R. Adve, "Hierarchical resource allocation in femtocell networks using graph algorithms," in IEEE International Conference on Communications (ICC), Feb. 2012.

M. Y. Arslan, J. Yoon, K. Sundaresan, S. V. Krishnamurthy, S. Banerjee, "A Resource Management System for Interference Mitigation in Enterprise OFDMA Femtocells," IEEE/ACM Transactions on Networking, Nov. 2012.

P. Hu, et al."Downlink Resource Management Based on Cross-Cognition and Graph Coloring in Cognitive Radio Femtocell Networks," Vehicular Technology Conference (VTC Fall), Sep. 3-6, 2012 IEEE.

Tan, Li, Zhiyong Feng, Wei Li, Zhong Jing, and T. Aaron Gulliver, "Graph coloring based spectrum allocation for femtocell downlink interference mitigation," in IEEE Wireless Communications and Networking Conference (WCNC 2011), pp. 1248-1252, Mar. 28-31, 2011.

[P. Mogensen et al., "LTE capacity compared to the Shannon bound," in Proc. of Vehicular Technology Conference (VTC2007), Apr. 2007.

D. Br'elaz, "New methods to color the vertices of a graph," Communications of the ACM, 22:251-256, Apr. 1979.

E. Dahlman, S. Parkvall, J. Sk¨ old, and P. Beming, 3G Evolution: HSPA and LTE for Mobile Broadband, Academic Press, New York, NY, USA, 2007.

"Evolved Universal Terrestrial Radio Access (E-UTRA); Further advancements for E-UTRA physical layer aspects (Release 9)," 3GPP TS 36.814, v9.0.0, Mar. 2010.

R. Jain, C. Dah-Ming, and H. William, "A quantitative measure of fairness and discrimination for resource allocation in shared computer system," Eastern Research Laboratory, Digital Equipment Corporation, 1984.

\* cited by examiner

INTERFERENCE MANAGEMENT FOR RADIO NETWORKS

FIELD

The embodiments discussed herein are related to interference management.

BACKGROUND

Increasing popularity of smart phones and other mobile devices, together with increasing use of mobile internet applications have led to an exponential growth of data rate demands on cellular systems generally employing licensed radio spectrum ("licensed spectrum") resources. At the same time, limited spectrum resources are available to allow mobile network operators (MNOs) to meet current and future data rate demands.

The MNOs are further faced with the challenge of poor indoor coverage, particularly at an edge of a telecommunication system cell. Poor indoor coverage may be a significant challenge for MNOs, as most data traffic and voice calls may originate from indoors.

To address the challenges of meeting ever-increasing data rate demands and poor indoor coverage, some proposed solutions include an increased reliance on femtocells. Generally, femtocells are small-range, low-power cells that may be deployed to enhance indoor coverage and offload some traffic from a macrocell. Offloading traffic to the femtocell may reduce congestion in the macrocell network and thus may help improve the experience for users connected to the telecommunication system via the macrocell. Like femtocells, other small cells such as picocells may also be used to reduce macrocell congestion and/or improve indoor coverage.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of controlling radio resources includes calculating multiple sets of scaled load estimates based on a single set of initial load estimates associated with estimated radio resource loads of multiple base stations. Each of the sets of scaled load estimates includes the single set of initial load estimates scaled by one of multiple scale factors. The method further includes determining multiple objective function results. Each objective function result is based at least in part on a result of an objective function for an individual set of scaled load estimates of the multiple sets of scaled load estimates. The method further includes determining an operating set of radio resources for multiple base stations based at least in part on the multiple objective function results.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Femtocells and other small cells may be used in a number of environments. It may be desirable to employ a high density of femtocells in environments that experience a high number of mobile devices and/or high requested data rates in a relatively small area, generally described herein as enterprise environments. Enterprise environments may include corporate premises, shopping complexes, stadiums, arenas, conference venues, dense residential regions, dense commercial regions, heavily trafficked urban regions, and the like.

When multiple femtocells or other small cells are deployed in a relatively small area, interference between neighboring femtocells may present a major challenge. Embodiments described herein may include interference management and resource allocation that consider a tradeoff between orthogonal frequency allocation and frequency reuse allocation. Orthogonal frequency allocation may avoid interference between femtocells. Frequency reuse may result in interference between femtocells, but in some instances, may increase throughput when compared to orthogonal frequency allocation.

In some embodiments described herein, the degree of orthogonal frequency allocation and the degree of frequency reuse may be selected such that a result of an objective function may be relatively optimized. Adaptive graph coloring may be used to allocate orthogonal frequencies and reused frequencies to relatively optimize the objective function. The objective function may be associated with an objective that relates to the operation of a radio network, including, but not limited to, total data rate provided to terminals of the radio network, maximum-minimum ("max-min") fairness to the terminals, and the like.

Some embodiments as herein described may relate to a communication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example communication systems described. Rather, the embodiments described herein may be applicable to other communication systems.

Embodiments of the present invention will be explained with reference to the accompanying drawings.

Figure 1:
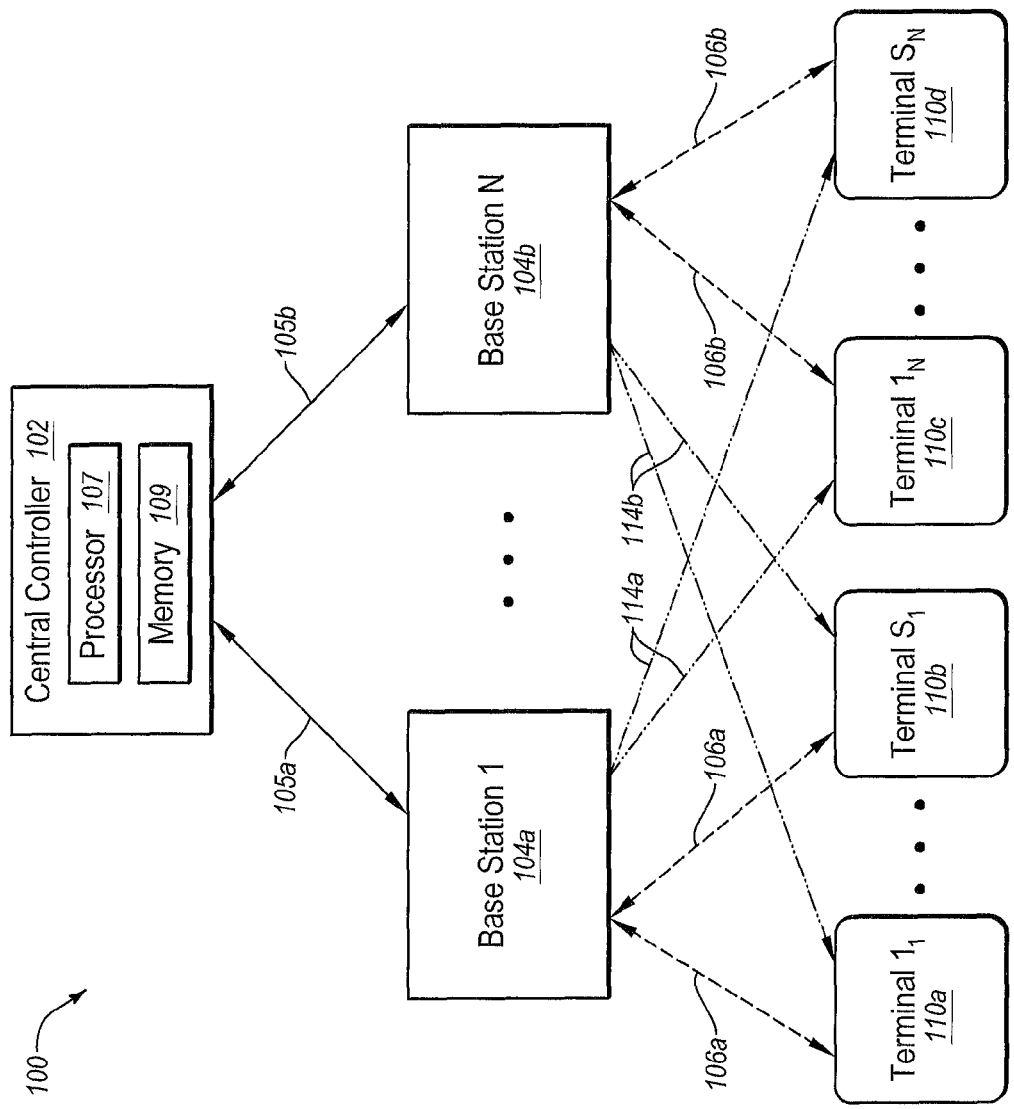
FIG. 1 is a diagrammatic view of an example network architecture of a telecommunication system.

FIG. 1 is a diagrammatic view of an example network architecture of a telecommunication system 100, arranged in accordance with at least one embodiment described herein. In some embodiments, the network architecture may include the network architecture of an Evolved Universal Mobile Telecommunications System (E-UMTS). The E-UMTS may include an LTE radio access network or the like. The radio access network may include an E-UMTS Terrestrial Radio Access Network (eUTRAN). However, other types of network architecture may be used.

The telecommunication system 100 may include multiple base stations, designated generally as a first base station 104a ("base station 104a") up to an Nth base station 104b ("base station 104b," collectively "base stations 104"). The base stations 104 may include base station equipment, including hardware and/or software for allowing radio communication with radio-communication-equipped nodes ("wireless nodes"). The base stations 104 may generally allow wireless nodes to wirelessly communicate with each other, and/or to wirelessly access a core network and/or an internet protocol (IP) network, or the like.

In some embodiments, the base stations 104 include multiple small cell base stations 104 deployed in an enterprise setting. For example, the base stations 104 may include multiple femtocells such as home eNodeBs (HeNBs) located in a close geographic region such as corporate premises, shopping complexes, stadiums, arenas, conference venues, dense residential regions, dense commercial regions, heavily trafficked urban regions, and the like.

In general, the base stations 104 may include hardware and software allowing radio communication over a licensed spectrum. The licensed spectrum may generally include portions of a radio spectrum licensed for transmission of wireless data, such as cellular data. For example, the base stations 104 may be configured to transmit cellular data that complies with an LTE, such as 3GPP specification releases 8-12.

The base stations 104 may communicate with a central controller 102 via interfaces formed between the base stations 104 and the central controller 102. For example, Interface 105a may be formed between the base station 104a and the central controller 102 and interface 105b may be formed between the base station 104b and the central controller 102. Interface 105a and interface 105b (collectively "interfaces 105") may include wired connections, but in some instances interfaces 105 may alternately include wireless connections. As disclosed herein, the central controller 102 may assist in interference management between base stations 104 and/or in resource management in the licensed spectrum such that the base stations 104 may be deployed in an enterprise environment. Alternately or additionally, the central controller 102 may be a part of one of the base stations 104 in the telecommunication system 100.

The central controller 102 may generally include a processor 107 and a memory 109. Instructions may be stored on the memory 109. When the instructions are executed by the processor 107, the central controller 102 may perform operations related to and/or including the processes described herein.

The telecommunication system 100 may include multiple wireless nodes communicating with the base stations 104 over licensed spectrums. Wireless nodes that may communicate over licensed spectrums are generally described herein as terminals. For example, terminals may include smartphones, computers, smart meters, and the like that allow LTE cellular communication.

As disclosed in FIG. 1, multiple terminals 110a, 110b, 110c, and 110d (collectively "terminals 110") may be associated with the base stations 104. For example, a first terminal 110a ("terminal 110a," designated as terminal $1_1$) through an $S_1$-th terminal 110b ("terminal 110b," designated as terminal $S_1$) may be associated with the base station 104a. Another first terminal 110c ("terminal 110c," designated as terminal $1_N$) through an $S_N$-th terminal 110d ("terminal 110d," designated as terminal $S_N$) may be associated with the base station 104b.

The terminals 110 may form licensed spectrum interfaces 106a and 106b (collectively "licensed spectrum interfaces 106") with their associated base stations 104. For example, the terminal 110a through the terminal 110b may form licensed spectrum interfaces 106a with the base station 104a. The licensed spectrum interfaces 106 are generally wireless connections between the terminals 110 and the base stations 104 that may allow data to be communicated between the terminals 110 and the base stations 104. The terminals 110 may also experience interference 114a and 114b (collectively "interference 114") from unassociated base stations 104. For example, the terminal 110a through the terminal 110b may experience interference 114b from the base station 104b. The terminal 110c through the terminal 110d may experience interference 114a from the base station 104a.

The base stations 104 and the terminals 110 may include processors and memory (not shown) analogous to the processor 107 and memory 109 of the central controller 102.

Each of the terminals 110 may have a number of connections, generally with different minimum communication rate requirements. Each minimum communication rate requirement may be a function of the traffic type of each connection. For example, the terminal 110a may simultaneously have a conversational voice connection and a transmission control protocol (TCP) based connection. According to quality of service (QoS) requirements of each connection for each terminal 110, the base stations 104 may set a minimum rate requirement for each of the terminals 110. The minimum rate requirement for a particular terminal 110a, 110b, 110c, or 110d may be set to the sum of the minimum rate requirements for all connections of the particular terminal 110a, 110b, 110c, or 110d. For example, the terminal 110a may have minimum rate requirement of "a" for a conversational voice communication and a minimum rate requirement of "b" for a TCP connection. As a result, the minimum rate requirement for the terminal 110a may be a+b.

Embodiments described herein may be employed, for example, to maximize the minimum rate experienced by the terminals 110. However, alternate objectives may be considered depending on the preferences of one or more mobile network operators (MNOs) that may use the telecommunication system 100. For example, an objective function may maximize the sum rate of the entire telecommunication system 100. An example optimization formula for maximizing the minimum rate experienced by the terminals 110 may be described below as Formula 1.

The formulas disclosed herein and the related discussions are generally described with reference to downlink communication from the base stations 104 to the terminals 110. Uplink communication from the terminals 110 to the base stations 104 may be alternately or additionally considered in an analogous manner. Furthermore, calculations disclosed herein related to LTE rate calculations may use Shannon capacity for simplifying the disclosure. However, other rate calculations may be conducted. For example, rate calculations may account for bandwidth efficiency due to different overheads such as cyclic-prefix and pilots. Furthermore, rate calculations may account for a signal to interference plus noise ratio (SINR) implementation efficiency due to receiver algorithms and supported modulation-coding schemes (MCS).

A number of the variables used in Formula 1 and/or other formulas disclosed herein are described below. Additional variables may be described in association with a particular formula and/or may be understood from the variable's context.

Variable N represents a number of base stations 104. Variable n represents a particular base station 104 of the N base stations 104; thus, n is generally a set of integers between 1 and N, inclusive.

$S_n$ represents the number of terminals 110 with licensed spectrum interfaces 106 connected to base station n. S represents the total number of terminals 110 in the network, i.e., the sum of $S_n$ for all N base stations 104. In Formula 1, i generally represents a particular terminal 110 within the entire telecommunication system 100; thus, for Formula 1, i is generally within a set of integers between 1 and S, inclusive. However, in all other formulas, i generally represents a particular terminal 110 associated with a particular base station n; thus, for other formulas, i is generally within a set of integers between 1 and $S_n$, inclusive.

$P_{max}^{(n)}$ represents the maximum transmission power of base station n.

K represents a total number of physical resource blocks (PRBs) associated with the licensed spectrum. Physical resource block k generally represents a particular PRB; thus, k is generally within a set of integers between 1 and K, inclusive. However, in some instances, k may represent one or more subcarriers of the PRBs. Although described with reference to PRBs, the embodiments described herein may be analogously employed with any radio resources of the telecommunication system 100.

$P_{i,k}^{(n)}$ represents the allocated power from base station n to terminal i on PRB or subcarrier k.

$h_{i,k}^{(n)}$ represents channel gain from base station n to terminal i on PRB or subcarrier k.

$\sigma^2$ represents noise variance per PRB in the licensed spectrum.

B represents total system bandwidth.

$\Omega_n$ represents a set of terminals connected to base station n.

$M_n$ represents a potential set of PRBs assigned to base station n.

$\Psi_n$ represents a set of PRBs assigned to base station n.

$$\max_{\{\Omega_n, p_{i,k}^{(n)}\}} \min_i \left( \sum_{k=1}^{K} \frac{B}{K} \log_2 \left( 1 + \frac{p_{i,k}^{(n)} h_{i,k}^{(n)}}{\sigma^2 + \sum_{m \neq n} p_{i,k}^{(m)} h_{i,k}^{(m)}} \right) \right) \quad \text{1a}$$

$$\text{subject to:} \sum_{k=1}^{K} \sum_{i \in \Omega_n} p_{i,k}^{(n)} \leq p_{max}^{(n)}, \forall n \quad \text{1b}$$

$$p_{i,k}^{(n)} \geq 0, \forall i, k, n \quad \text{1c}$$

$$\bigcup_{n=1}^{N} \Omega_n \subseteq \{1, 2, \ldots, S\} \quad \text{1d}$$

$$\Omega_n \cap \Omega_m = \emptyset, m \neq n \quad \text{1e}$$

Formula 1

Subformulas 1b-1e represent various constraints of Formula 1. For example, subformula 1b represents the total transmission power constraint of each of the base stations 104.

Furthermore, subformula 1c represents the transmission powers of the base stations 104 as non-negative. If the telecommunication system 100 has enough capacity to serve all S terminals 110, the union of the sets $\Omega_n$ for all base stations n, may equal the set $\{1, 2, \ldots, S\}$, otherwise, some terminals 110 may not be granted admission and, therefore, the union of the sets $\Omega_n$ may be a subset of $\{1, 2, \ldots, S\}$ as represented by subformula 1d.

Subformula 1e represents that each of the terminals 110 are connected to only one of the base stations 104.

Formula 1 represents an optimal association of the terminals 110 to the base stations 104 by finding a set $\Omega_n$ representing the optimal power allocation for each terminal i and for each PRB k. Finding the optimal power allocation for each of the terminals 110 and for each of the K PRBs may promote optimal max-min fairness on the telecommunication system 100.

Formula 1 is a non-convex mixed-integer programming problem, in part due to the binary association variables associated with $\Omega_n$. Moreover, to find a solution to Formula 1 at a central controller 102 generally expects the central controller 102 to know the channel gains of the terminals 110 on all PRBs. As a result, solving Formula 1 may be very hard and computationally impractical in many instances.

In some embodiments, a sub-optimal hierarchical approach may be used in place of solving Formula 1. The tasks associated with the sub-optimal hierarchical approach may be divided between the base stations 104 and the central controller 102.

In some embodiments, it may be assumed that each of the terminals 110 may be associated with one of the base stations 104 that has the largest average received signal power and the largest observed signal-to-interference-plus-noise ratio (SINR) at the individual terminals 110. Such an assumption may make solving Formula 1 easier, as the binary association variables associated with $\Omega_n$ may be known.

Figure 2:
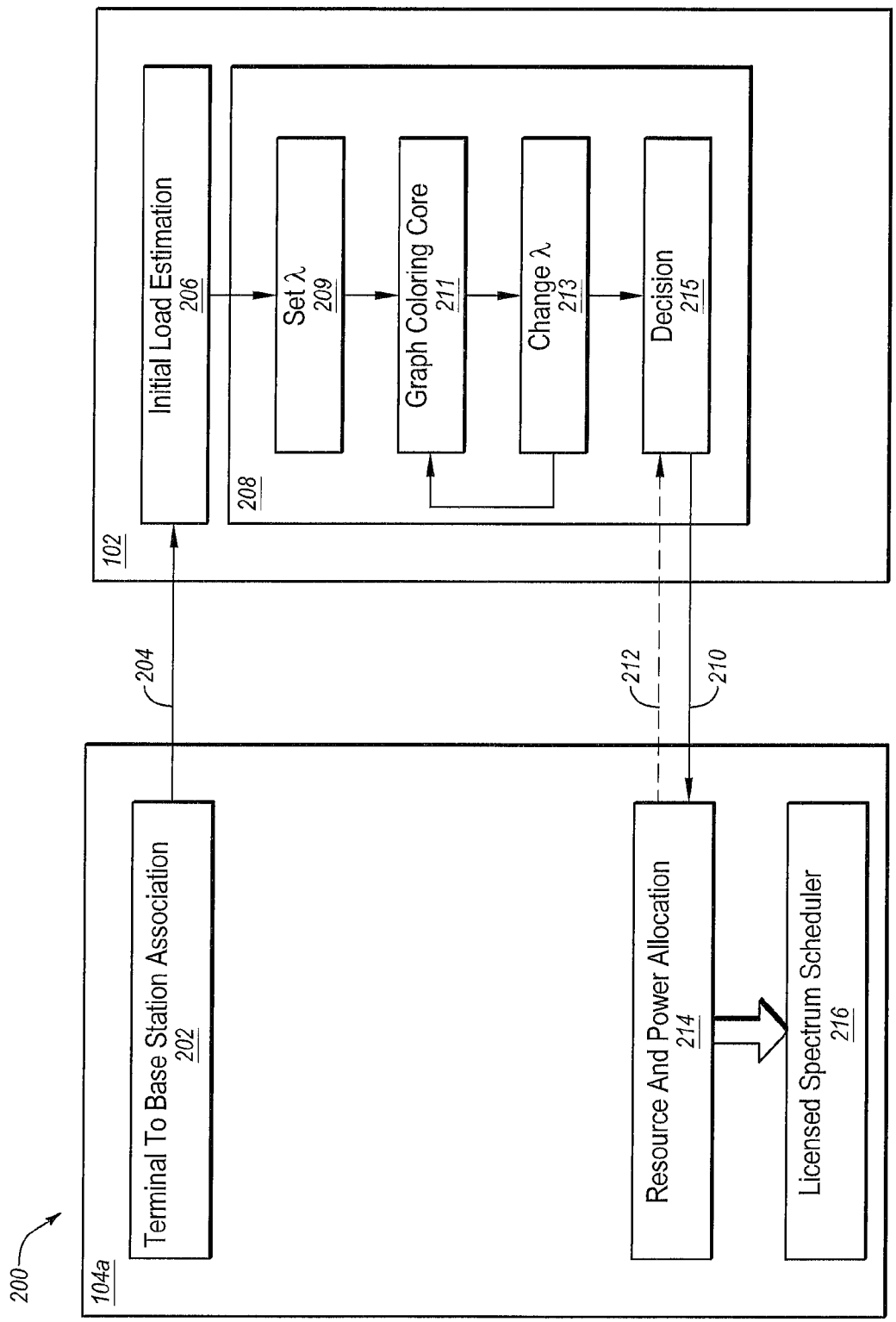
FIG. 2 is a diagrammatic view of telecommunication processes performed by a central controller and a base station.

With continued reference to FIG. 1, FIG. 2 is a diagrammatic view of telecommunication processes 200 performed by the central controller 102 and the base station 104a, arranged in accordance with at least one embodiment described herein. Although only one base station 104a is shown in FIG. 2, the telecommunication processes 200 may be performed by the multiple base stations 104, which may function in the same way or a similar way to the functions of the base station 104a as described below.

As represented by block 202, the base station 104a may perform terminal to base station 104a association such that the terminal 110a through the terminal 110b are associated with the base station 104a. In some embodiments, the base station 104a may inform the central controller 102 of the number of terminals associated with the base station 104a, as represented by line 204.

In some embodiments, the central controller 102 may perform an initial load estimation 206 based on the number of terminals associated with the base stations 104. The initial load estimation 206 may be performed for the base stations 104 and the loads of the base stations 104 may be defined as the resources desired by the base stations 104.

The central controller 102 may initially distribute resources among base stations 104 according to an initial load estimate represented as $\tilde{M}_n$, which may be determined as disclosed in Formula 2.

$$\tilde{M}_n = \left\lfloor \frac{S_n}{\sum_{m=1}^{N} S_m} K \right\rfloor \quad \text{Formula 2}$$

The central controller 102 may perform interference management and licensed spectrum resource assignment for the base stations 104 via adaptive graph coloring 208. The adaptive graph coloring 208 may be based on the $\tilde{M}_n$ output of the initial load estimation 206. Based on the graph coloring, the central controller 102 may assign licensed spectrum resources, i.e., a set of PRBs, to each of the base stations 104, including the base station 104a, as represented by line 210. As described below, the adaptive graph coloring 208 may be based on feedback from the base stations 104, such as the base station 104a, as represented by line 212.

Initial graph coloring based on the initial load estimation in Formula 2 may result in orthogonal frequency allocation of resources as $\Sigma_{n=1}^{N}M_n = \Sigma_{n=1}^{N}\tilde{M}_n \cong K$, where the approximation sign results from the rounding operator in Formula 2. Using the embodiments disclosed herein, the resources may be allocated such that $\Sigma_{n=1}^{N}M_n \geq K$.

As part of the adaptive graph coloring 208, the central controller 102 may construct an interference graph based on base station measurements from the base stations 104 and/or reports from the terminals 110. In some embodiments, the base station measurements may be determined at least in part by the base station 104a when the base station 104a is powered on. For example, the base station 104a may capture control channels and reference signal transmissions of neighboring base stations 104. From the information collected from the neighboring base stations 104, the base station 104a may determine the cell identification of the neighboring base stations 104 as well as determine a path loss from each of the neighboring base stations 104 to the base station 104a. Reports from terminals 110 may include received signal strength indicator (RSSI) signals of the neighboring base stations 104 that the terminals 110 may receive during handover processes.

The central controller 102 may construct an interference graph of vertices representing the base stations 104 and directed edges representing interference and/or jamming conditions between the base stations 104. In some embodiments, interference and/or jamming conditions may be declared when the difference between channel gains experienced by a terminal from an associated base station and an interfering base station exceed a pre-determined threshold. As a result, weak interference signals may be neglected. Advantageously, by neglecting weak interference signals the complexity of the interference graph may be reduced and the graph coloring process described herein may be simplified. Alternately, all possible interference conditions may be considered for a directed edge between any two of the base stations 104.

The adaptive graph coloring 208 may include performing a graph coloring core 211 for multiple potential allocations of resources and making a decision 215 as to which potential allocation of resources may provide an optimal result to an objective function.

The complexity of an exhaustive search of $M_n$ to determine an optimal result to an objective function may be exponential with respect to the number of base stations 104. In some embodiments described below, the complexity of determining a relative optimal result may be linear with respect to the number of base stations 104.

In some embodiments, the graph coloring core 211 may be performed for multiple sets of scaled load estimates, which may be based on the initial load estimates, determined by the initial load estimation 206, scaled by a scale factor. The scale factor is represented by $\lambda$ and may be initially set in block 209. After performing the graph coloring core 211, the scale factor may be changed 213 and the graph coloring core 211 may be performed again with new scaled load estimates based on the initial load estimates scaled by the changed scale factor.

Scaling the load estimates by a scale factor, performing the graph coloring core 211, and changing the scale factor 213 may be repeated for a set of scale factors before continuing to the decision block 215. For example, the process may be repeated by linearly incrementing a set of scale factors represented by $\lambda \in [1:\Delta:N]$, where $\Delta$ represents a step size and N represents a maximum scale factor to be considered. In some embodiments, N may equal the number of base stations 104. Alternately, a bisection method may be used to determine a suitable scale factor.

An example of determining candidate loads, represented by $\hat{M}_n$, may be determined as disclosed in Formula 3.

$$\hat{M}_n = \min(\lfloor \lambda \tilde{M}_n \rfloor, K) \quad \text{Formula 3:}$$

In Formula 3, $\tilde{M}_n$, the initial load estimation, is scaled by the scale factor $\lambda$. An example of determining a relative optimal load, represented by $M_n^*$, may be determined as disclosed in Formula 4.

$$M_n^* = \min(\lfloor \lambda \tilde{M}_n \rfloor, K) \quad \text{Formula 4:}$$

In Formula 4, $\lambda^*$ represents a relative optimal scale factor.

At block 215, the adaptive graph coloring 208 may include determining an operating set of PRBs that provide a relative optimal result to the objective function. The relative optimal results may be associated with a relative optimal set of scaled load estimates relative to all of the sets of scaled load estimates considered.

If the scale factor is linearly incremented, a relatively smaller step size, i.e., a smaller $\Delta$, of the scale factor may generally increase how closely the relative optimal set of scaled load estimates are to an actual optimal. However, the relatively smaller step size may increase the number of times the graph coloring core 211 is performed and may increase the computational resources used to perform the adaptive graph coloring 208. The step size may be chosen to balance how closely the operating set of scaled load estimates may be to optimal with the computational resources used to perform the adaptive graph coloring 208.

Similarly, if the scale factor is changed according to a bisection method, more iterations of bisecting the scale factor may generally increase how closely the relative optimal set of scaled load estimates are to an actual optimal. However, performing more iterations may increase the number of times the graph coloring core 211 is performed and may increase the computational resources used to perform the adaptive graph coloring 208. The number of iterations and/or a bisection resolution may be chosen to balance how closely the operating set of scaled load estimates may be to optimal with the computational resources used to perform the adaptive graph coloring 208.

Regarding the graph coloring core 211, optimal graph coloring is a non-deterministic polynomial-time hard ("NP-hard") problem conventionally solved using heuristics. In some embodiments, an iterative greedy algorithm as disclosed herein may be used. The iterative greedy algorithm may allow frequency reuse between base stations 104 where significant interference is not expected. As a result, the system capacity may be increased. To perform the iterative greedy algorithm, a conventional interference graph formula may be modified into a weighted interference graph where the weight of each directed edge, i.e., $\rho_{nm}$, is given by Formula 5.

$$\rho_{nm} = \frac{P_{max}^{(n)}}{M_n} G_{nm} \quad \text{Formula 5}$$

Variable $G_{nm}$ of Formula 5 represents an average path loss between base station n and base station m, which may be defined as an average path loss between base station n and the terminals associated with base station m. Alternately, $G_{nm}$ may be defined as the path loss between base station n and a fictitious terminal located at base station m.

The value $$\frac{P_{max}^{(n)}}{M_n}$$

represents the average power per PRB for base station n.

Introducing weighting to the interference graph may promote the graph coloring scheme to be adaptive to the demands of the base stations 104 in terms of requested load. For example, if the total requested load of all base stations 104 is less than or equal to the total number of available PRBs and/or channels in the system, i.e., if $\Sigma_{n=1}^{N} M_n \leq K$, then orthogonal frequency allocation may be provided by the graph coloring algorithm without mutual interference between base stations 104. However, if the base stations 104 request more PRBs than are available for the telecommunication processes 200, the graph coloring algorithm disclosed herein may reuse frequencies of PRBs, i.e., colors, in a way that minimizes the interference seen by each of the base stations 104, rather than assigning each of the base stations 104 fewer PRBs than requested.

Figure 3:
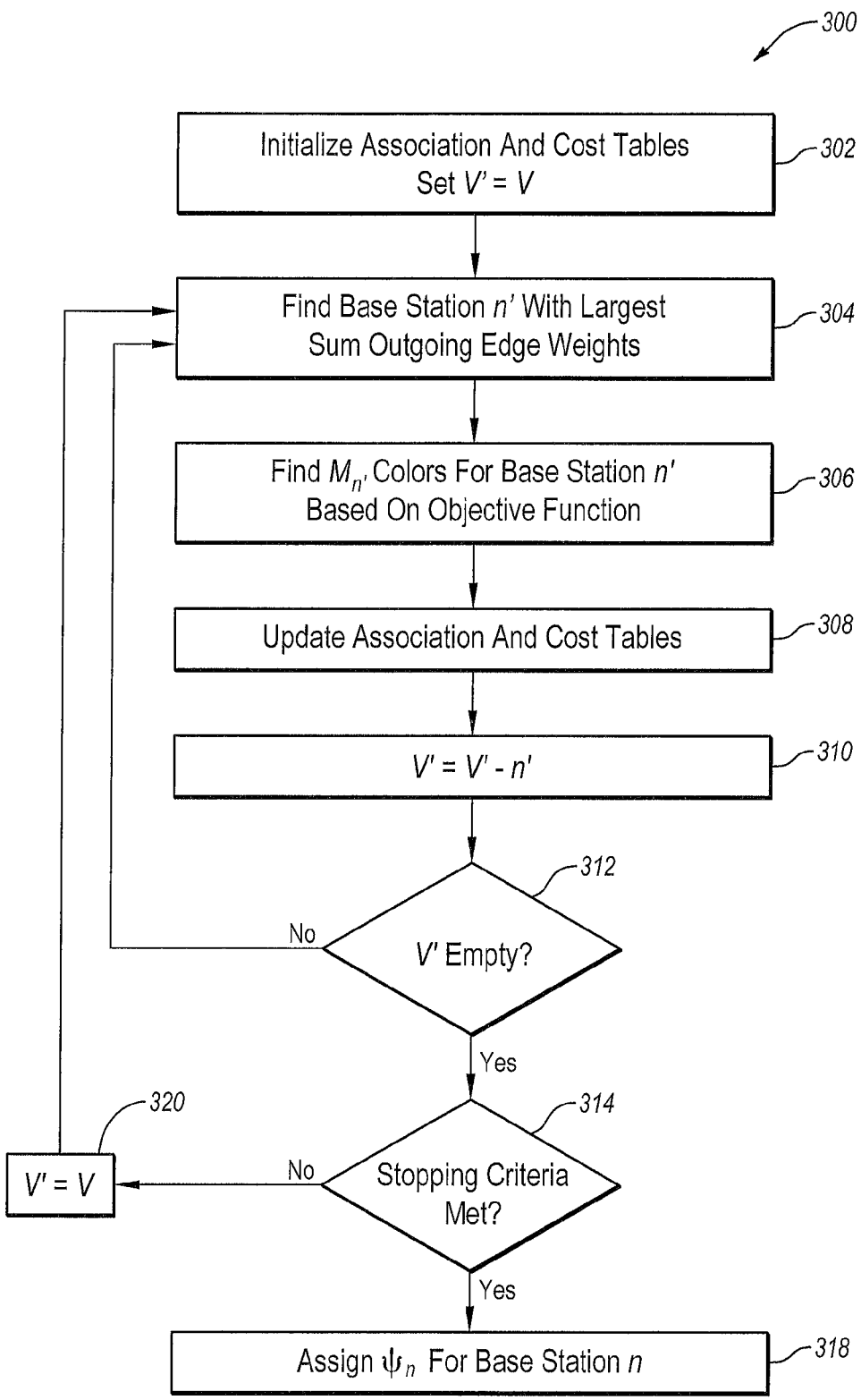
FIG. 3 is a flowchart of an example graph coloring method that may be employed as a graph coloring core.

FIG. 3 is a flowchart of an example graph coloring method 300 that may be employed as the graph coloring core 211 of FIG. 2 arranged in accordance with at least one embodiment described herein. The graph coloring method 300 may employ frequency reuse. The method 300 may begin at block 302, where an association table and a cost table may be initialized by setting all entries in the association and cost tables to 0. Furthermore, set V', which represents the set of uncolored vertices in the constructed interference graph, may be defined to be equal to V, which represents the set of all vertices in the constructed interference graph. Each vertex of the constructed interference graph may represent one of the base stations 104.

The association table may be an N×J table with binary entries $a_{nj}$. N may be the total number of base stations 104 and J may be the total number of colors. The parameter J may be set equal to K, i.e., one color may be denoted per each available PRB. Alternately, the parameter J may be set equal to K/v, i.e., one color may be denoted per v PRBs. A value of v greater than 1 may decrease the complexity of the graph coloring, but at the expense of creating a coarser and less flexible channel assignment. An entry $a_{nj}$ in the association table may be set to 1 if base station n is assigned color j. Otherwise, the entry $a_{nj}$ may be set to 0.

The cost table may be an N×J table with real-valued entries representing the cost of using color j for base station n. The cost may be defined as the sum of the interference powers from all other base stations 104 assigned the color j. An entry $c_{nj}$ may be defined as disclosed in Formula 6.

$$c_{nj} = \sum_{\substack{m=1 \\ m \neq n}}^{N} a_{mj} \frac{P_{max}^{(m)}}{M_m} G_{mn} \quad \text{Formula 6}$$

The method 300 may continue at block 304, where a base station n' causing the largest sum interference may be found. In some embodiments, this may include choosing the base station n' with the largest sum of outgoing edge weights as disclosed in Formula 7.

$$n' = \operatorname*{argmax}_{n \in V} \sum_{\substack{m=1 \\ m \neq n}}^{N} \rho_{nm} = \operatorname*{argmax}_{n \in V} \frac{P_{max}^{(n)}}{M_n} \sum_{\substack{m=1 \\ m \neq n}}^{N} G_{nm} \quad \text{Formula 7}$$

Choosing the base station causing the largest sum interference may be advantageous, as the chosen base station n' may be considered to be the most troublesome of the base stations 104. In some embodiments, if more than one base station n' has the same largest sum of outgoing edge weights, the base station n' with the largest $M_n$ may be chosen.

The method 300 may continue at block 306, where $M_{n'}$ colors may be selected for the base station n' chosen in block 304. The $M_{n'}$ colors may be selected based on an objective function. The objective function may include a quantification of an objective of a telecommunication system, such as the telecommunication system 100 of FIG. 1. The $M_{n'}$ colors may be selected based on maximizing, minimizing, or otherwise optimizing the objective function.

In some embodiments, the $M_{n'}$ colors may be selected to maximize a sum rate of communication between the terminals 110 and the base stations 104 of the telecommunication system ("sum rate"). In some instances, interference may be increased on lightly loaded base stations 104 while interference may be decreased or eliminated on heavily loaded base stations 104 to increase the sum rate of the telecommunication system.

By way of example, the $M_{n'}$ colors that maximize an estimated rate for base station n' may be selected. Based on the cost $c_{nj}$, the estimated rate obtained by base station n' over color j may be determined as disclosed in Formula 8.

$$r_{n'j} = \log_2\left(1 + \frac{(P_{max}^{(n')}/M_{n'})\overline{H}^{(n')}}{\sigma^2 + c_{n'j}}\right) \quad \text{Formula 8}$$

In Formula 8, $\overline{H}^{(n')}$ represents the average channel gain from base station n' to its terminals 110. The potential sum rate obtained by base station n' if color j is assigned to base station n' may be determined as disclosed in Formula 9.

$$\tilde{R}^{(n')} = \sum_{q=1}^{J} \tilde{a}_{n'q} r_{n'q} \quad \text{Formula 9}$$

In Formula 9, $\tilde{a}_{n'q} = a_{n'q}$ if $q \neq j$, and $\tilde{a}_{n'q} = 1$ if $q = j$. Thus, $\tilde{a}_{n'q}$ ⊐q may carry the entries of the association table of base station n' from a previous iteration of blocks 304 through 310, i.e., if the method 300 returns to block 304 from block 312 or block 314, as disclosed below. The entry at the $j^{th}$ carrier, i.e., the entry under evaluation, may be set to 1. Initially, the first iteration of block 306 may include $\tilde{a}_{n'q}=a_{n'q}=0$ if $q \neq j$, and $\tilde{a}_{n'q}=1$ if $q=j$.

A reward function, symbolized by $R_j$, may represent the potential network rate if color j is assigned to base station n'. The reward function $R_j$ may be determined as disclosed in Formula 10.

$$R_j = \sum_{n=1}^{N} \hat{R}^{(n)} \qquad \text{Formula 10}$$

The $M_{n'}$ colors with the largest reward function $R_j$ may be determined. In some embodiments, if more than $M_{n'}$ colors result in the same minimal cost, the colors that are most frequently used are chosen. The colors that are most frequently used may be identified from the association table. Selecting the colors that are most frequently used may provide less interference for subsequent base stations 104 in the coloring process, as colors that are less frequently used generally have a higher probability of having a lower cost to the subsequent base stations 104.

The method 300 may continue to block 308, where the allocation table and cost table are updated. The allocation table and the cost table are generally updated to reflect the colors, i.e., PRBs, allocated to the base station n' in block 306. In block 310, the set of uncolored vertices, V', is updated by removing the vertex associated with the base station n' from the set.

In block 312, the set of uncolored vertices, V', is checked to determine whether the set is empty. If V' is empty, i.e., if all of the vertices are colored, the method 300 continues to block 314. However, if V' is not empty, i.e., if one or more vertices have not been colored, the method 300 returns to block 304, where a new base station n' is chosen and subsequently colored in block 306.

At block 314, it may be determined whether stopping criteria have been met. If the stopping criteria are met, the method 300 may continue to block 318. If the stopping criteria are not met, the method 300 may continue to block 320, where the set of uncolored vertices, V', may be again defined as the set of all vertices V, and blocks 304-314 of the method 300 may be repeated. The iterative approach to the graph coloring introduced by blocks 314 and 320 may enhance the graph coloring method 300. In some embodiments, because the method 300 performs coloring of vertices in a sequential manner, the effect of a colored base station is not taken into consideration in the objective function of previously colored base stations, which may be mitigated by coloring base stations in a descending order of the amount of interference they cause in block 304. This sequential behavior is enhanced by the iterative approach by repeating blocks 304-314. In block 320, the association table and the cost table may not be re-initialized such that the base station coloring performed in previous iterations may affect the color selection in block 306 in subsequent iterations. Stopping criteria may include a maximum number of iterations, a steady state value for a rate metric, or the like.

When the stopping criteria have been met in block 314, the method 300 may continue to block 318. The method 300 may conclude at block 318 by assigning base station n a final set of PRBs, represented by $\Psi_n$, according to the association table.

Referring again to FIG. 2, an output of the method 300 may include multiple sets of $\Psi_n$ to the decision block 215, as the method 300 may have been repeated for multiple sets of scaled load estimates at the graph coloring core 211.

At the decision block 215, the adaptive graph coloring 208 may consider the multiple sets of $\Psi_n$ and determine an operating set of allocated resources, represented by $\Psi_n^*$. Determining an operating set of allocated resources may generally correspond to determining an operating scale factor, represented by $\lambda^*$, and/or determining an operating set of scaled load estimates, represented by $M_n^*$.

In some embodiments, $\Psi_n^*$ may be selected by estimating the effect each set of $\Psi_n$ may have on the network according to an objective function ("estimation-based adaptive graph coloring"). Alternately or additionally, $\Psi_n^*$ may be selected by operating the network with each set of $\Psi_n$ and considering the effect each set of $\Psi_n$ has on the network according to an objective function ("feedback-based adaptive graph coloring").

1. Estimation-Based Adaptive Graph Coloring

The central controller 102 may calculate results of an objective function at the decision block 215 to estimate the effect each set of $\Psi_n$ may have on the network. For example, the central controller 102 may determine the estimated rates of the base stations 104 associated with the sets of $\Psi_n$. A potential rate obtained by the base stations 104 using the resources $\Psi_n$ may be determined as disclosed in Formula 11.

$$\hat{R}^{(n)} = \sum_{j \in \Psi_n} r_{nj} \qquad \text{Formula 11}$$

$$= \sum_{j \in \Psi_n} \log_2\left(1 + \frac{(P_{max}^{(n)}/M_n)\overline{H}^{(n)}}{\sigma^2 + \sum_{\substack{m=1 \\ m \neq n}}^{N} a_{mj}\frac{P_{max}^{(m)}}{M_m}G_{mn}}\right)$$

The average rate of the terminals 110 for each of the base stations 104 may be determined as disclosed in Formula 12.

$$\max_{\lambda}\min_{n}\frac{\hat{R}^{(n)}}{S_n} \qquad \text{Formula 12}$$

The central controller 102 may determine a $\Psi_n^*$ that maximizes the estimated rate obtained by the base stations 104. For example, the central controller 102 may set $\Psi_n^*$ as the $\Psi_n$ that corresponds to a $\lambda$ that maximizes $\min_n$ $$\frac{\hat{R}^{(n)}}{S_n}$$

in Formula 12. Alternately, other objective functions may be used in place of the objective function disclosed in Formula 12.

The central controller 102 may provide the operating set of allocated resources, i.e., $\Psi_n^*$, to the base stations 104, including the base station 104a as indicated by line 210.

2. Feedback-Based Adaptive Graph Coloring

The central controller 102 may provide each set of $\Psi_n$ to the base stations 104, including the base station 104a as indicated by line 210. In some embodiments, each set of $\Psi_n$ may alternately or additionally be provided to the base stations 104 after the set of $\Psi_n$ is produced by the graph coloring core 211.

The base stations 104 may operate using each set of $\Psi_n$ and may provide feedback to the central controller 102 as indicated by line 212. The feedback 212 may be related to some measurement of performance experienced by the base stations 104 for each set of $\Psi_n$. For example, the base station 104a may perform resource and power allocation 214 as disclosed below according to the provided sets of $\Psi_n$ and may determine an actual achieved rate of the base station 104a from the sum of the rates of the associated terminals 110 as disclosed in Formula 13.

$$\hat{R}^{(n)} = \sum_{i \in \Omega_n} \frac{B}{K} \sum_{k \in \Psi_n} s_{i,k}^{(n)} \log_2 \left( 1 + \frac{p_{i,k}^{(n)} h_{i,k}^{(n)}}{s_{i,k}^{(n)} \left( \sigma^2 + \sum_{m \in I_k} P_k^{(m)} G_{mni} \right)} \right)$$ Formula 13

The central controller 102 may then determine an actual rate obtained by the base stations 104 using the $\Psi_n$ via the Formula 12. The central controller 102 may determine a $\Psi_n^*$ that maximizes the actual rate obtained by the base stations 104. Alternately, other criteria and/or other objective functions may be used.

3. Resource and Power Allocation

The base station 104a may perform resource and power allocation 214 for each of the terminals 110 assigned to the base station 104a. The resource and power allocation 214 may include fine-tuning the resource allocation to each of the terminals 110 and performing power allocation on a per-PRB basis for resources in the licensed spectrum.

The central controller 102 may generally perform coarse-resolution resource allocation through adaptive graph coloring 208, generally on a longer timescale than the base station 104a fine-tunes the resource allocation to each of the terminals 110. The set of PRBs assigned 210 to each base station 104 may be assigned to achieve a trade-off between interference control between the base stations 104 and spectrum reuse to enhance the total throughput in the telecommunications system.

The base station 104a may perform fine-resolution resource allocation to the terminals 110 assigned to the base station 104a via the resource and power allocation 214, generally on a shorter timescale than the central controller 102 which performs coarse-resolution resource allocation. For example, in embodiments employing LTE-A, resource reallocation may be allowed every Transmission Time Interval (TTI), generally equal to 1 millisecond (ms). In some embodiments, the central controller 102 may perform adaptive graph coloring 208 and PRB assignment 210 on a timescale of hundreds of TTIs, whereas the base station 104a may perform resource and power allocation 214 every TTI or every few TTIs.

In some embodiments, to ensure fairness among terminals, the base station 104a performs licensed spectrum allocation and per-PRB power allocation at block 214 according to a max-min fairness criteria described in Formula 14.

Formula 14

$$\max_{\{p_{i,k}^{(n)}, s_{i,k}^{(n)}\}} \min_i \frac{B}{K} \sum_{k \in \Psi_n} s_{i,k}^{(n)} \log_2 \left( 1 + \frac{p_{i,k}^{(n)} h_{i,k}^{(n)}}{s_{i,k}^{(n)} \left( \sigma^2 + \sum_{m \in I_k} P_k^{(m)} G_{mni} \right)} \right)$$ 14a -continued subject to: $\sum_{k \in \Psi_n} \sum_{i \in \Omega_n} p_{i,k}^{(n)} \leq P_{max}^{(n)}$  14b $\sum_{i \in \Omega_n} s_{i,k}^{(n)} = 1$  14c $p_{i,k}^{(n)} \geq 0, \forall i \in \Omega_n, k \in \Psi_n$  14d $s_{i,k}^{(n)} \geq 0, \forall k \in \Psi_n$  14e Along with the assigned PRBs, i.e., $\Psi_n$, the central controller 102 may also send each of the base stations 104 a set of interfering base stations 104 on each PRB k, represented by $I_k$. The central controller 102 may also send each of the base stations 104 the average transmission power of every interfering base station m in $I_k$ and PRB k, represented by $P_k^{(m)}$. The value of $P_k^{(m)}$ may be approximated with the value $$\frac{P_{max}^{(m)}}{M_m}.$$

In Formula 14, $G_{mni}$ represents the path loss from base station m to terminal i associated with base station n. In some embodiments, the central controller 102 may broadcast the locations of the base stations 104 to all of the base stations 104 in the network. Alternately, the central controller 102 may provide each of the base stations 104 with the locations of neighboring base stations 104 with a high possibility of causing interference with the particular base stations 104. For example, the central controller 102 may provide the base station 104a with the locations of neighboring base stations 104 with a high possibility of causing interference with the base station 104a, when the base station 104a is in a dense configuration with the base stations 104. The locations of the base stations 104 may not need to be updated frequently when locations of the base stations 104 are static or semi-static.

Using the locations of the interfering base stations m in $I_k$, the base station n may estimate the value of $G_{mni}$ using the locations of the associated terminals i in $\Omega_n$. The base stations 104 may thus calculate the potential interference each of the associated terminals 110 may encounter from neighboring base stations 104. In some embodiments, a rough estimate of the value of $G_{mni}$ may be obtained by considering average path loss from base station m to base station n as may be used in the adaptive graph coloring 208. The average path loss is represented by $G_{mn}$ in Formulas 3, 4, 5, and 9.

The variable $s_{i,k}^{(n)}$ represents a time sharing coefficient of PRB k for terminal i in base station n. Where the resources may be allocated each TTI, the base stations 104 may allocate PRBs to terminals 110 over a period of multiple TTIs. A time share of each PRB k may potentially be allocated to each terminal i.

Formula 14 may maximize the smallest achieved rate among the terminals 110 associated with base station n. Subformula 14b represents that a base station n does not have unlimited power by upper-bounding the sum of the of the per-PRB power over all of the PRBs in $\Psi_n$ and all of the terminals 110 associated with base station n by the max transmission power, i.e., $P_{max}^{(n)}$, of base station n.

Subformula 14c represents that the sum of time shares of PRB k for the terminals 110 associated with base station n equals 1. Subformulas 14d and 14e represent ranges of the optimization variables $p_{i,k}^{(n)}$ and $s_{i,k}^{(n)}$.

Formula 14 is a convex optimization problem that may be solved efficiently and in an easy manner. However, in some embodiments, Formula 14 may be simplified. For example, $$\frac{p_{i,k}^{(n)}}{s_{i,k}^{(n)}}$$

may be approximated as $$\frac{P_{max}^{(n)}}{M_n},$$

where $M_n$ represents the size of the set of PRBs assigned to base station n by the central controller 102. Formula 14 may simplify as disclosed in Formula 15.

Formula 15

$$\max_{s_{i,k}^{(n)}} \min_{i} \frac{B}{K} \sum_{k \in \Psi_n} s_{i,k}^{(n)} \log_2\left(1 + \frac{p_{max}^{(n)} h_{i,k}^{(n)}}{M_n\left(\sigma^2 + \sum_{m \in I_k} P_k^{(m)} G_{mni}\right)}\right) \quad 15a$$

$$\text{subject to:} \sum_{i \in \Omega_n} s_{i,k}^{(n)} = 1, \forall k \in \Psi_n \quad 15b$$

$$s_{i,k}^{(n)} \geq 0, \forall i \in \Omega_n, \forall k \in \Psi_n \quad 15c$$

Formula 15 is a linear programming problem that may be computationally easier to solve than Formula 14.

In Formula 14 and Formula 15, the base stations 104 employ average interference information received from the central controller 102. The average interference information may result in an achieved rate from the respective optimization problem that is relatively close to the actual achieved rate. However, in some embodiments, the average interference information may not be sent by the central controller 102 to the base stations 104 such that the communication overheads between the central controller 102 and the base stations 104 are reduced.

In some embodiments, the SNR—as opposed to the SINR—may be considered. When the SNR is considered, the central controller 102 may send only the set of allocated PRBs to the base stations 104, reducing the communication overhead between the central controller 102 and the base stations 104. However, performance may be degraded, particularly where the average requested rate of all terminals 110 is relatively high and the interference is large enough that it may be detrimental to ignore.

In embodiments where the interference is ignored, the optimization problem may be formulated as in Formula 14, but with the interference term omitted from the denominator. The resulting formula may be further simplified in a manner similar to Formula 15, as disclosed in Formula 16. Formula 16 is a linear programming problem that may require less communication overhead than Formula 15.

Formula 16

$$\max_{s_{i,k}^{(n)}} \min_{i} \frac{B}{K} \sum_{k \in \Psi_n} s_{i,k}^{(n)} \log_2\left(1 + \frac{p_{max}^{(n)} h_{i,k}^{(n)}}{M_n \sigma^2}\right) \quad 16a$$

$$\text{subject to:} \sum_{i \in \Omega_n} s_{i,k}^{(n)} = 1, \forall k \in \Psi_n \quad 16b$$

$$s_{i,k}^{(n)} \geq 0, \forall i \in \Omega_n, \forall k \in \Psi_n \quad 16c$$

The base station 104a may include an optional licensed spectrum scheduler 216, that may manage additional scheduling requirements. For example, in embodiments employing LTE, the licensed spectrum scheduler 216 may accommodate hybrid automatic repeat request (HARQ) error correction scheduling. In other embodiments, the licensed spectrum scheduling 216 may accommodate other error checking and/or scheduling features.

The licensed spectrum scheduler 216 may apply conventional licensed spectrum scheduling mechanisms. For example, the licensed spectrum scheduler 216 may schedule downlink packets according to scheduling mechanisms that take into account the varying nature of the channel, uplink CQI reports of terminals, and/or acknowledgement (ACK) or negative acknowledgement (NAK) feedback from the terminals.

The licensed spectrum scheduler 216 may run more frequently than the resource and power allocation 214 to promote a finer scheduling resolution more adaptive to channel conditions.

Figure 4:
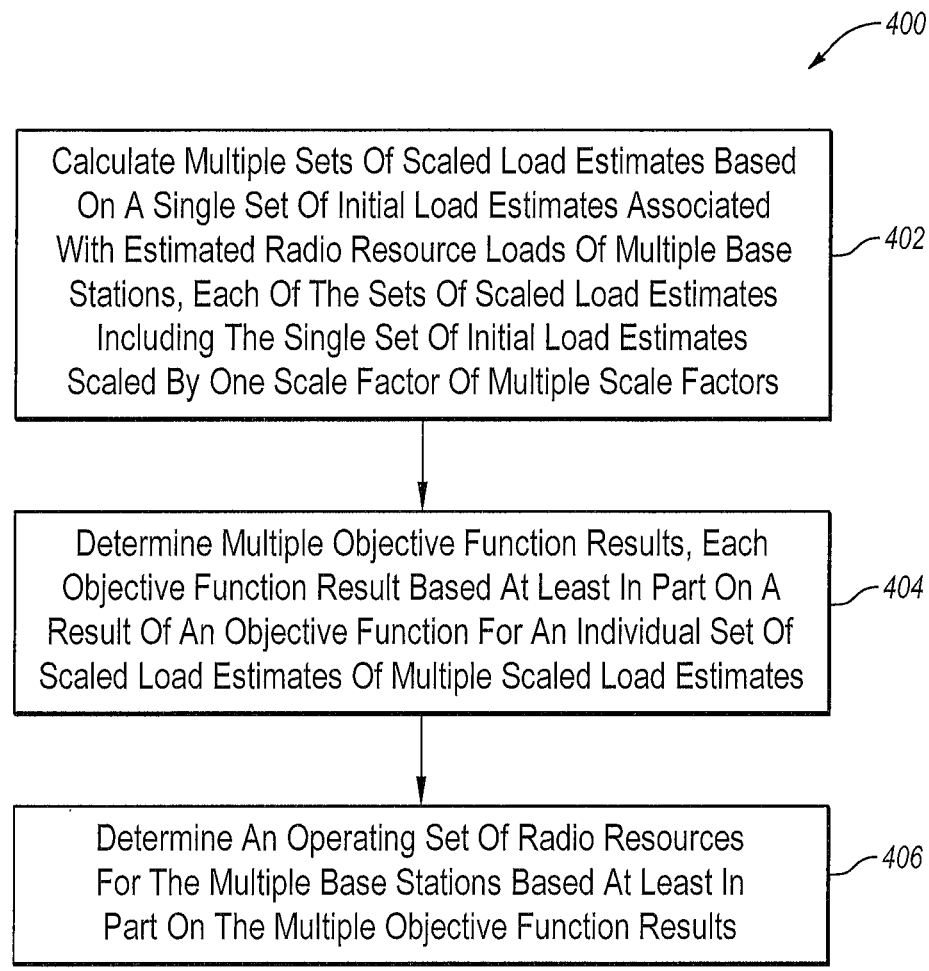
FIG. 4 is a flowchart of an example method of controlling radio resources.

FIG. 4 is a flowchart of an example method 400 of controlling radio resources. The method 400 may be performed by a central controller in a telecommunication system, such as the central controller 102 of FIG. 1.

The method 400 may begin at block 402 by calculating multiple sets of scaled load estimates based on a single set of initial load estimates. The single set of initial load estimates is associated with estimated radio resource loads of multiple base stations. Each of the sets of scaled load estimates may include the single set of initial load estimates scaled by one scale factor of multiple scale factors.

The method 400 may continue at block 404 by determining multiple objective function results. Each objective function result may be based at least in part on a result of an objective function for an individual set of scaled load estimates of multiple scaled load estimates.

In some embodiments, the objective function may include a reward function such as Formula 12 disclosed above. The relative optimal set of scaled load estimates may further be associated with the reward function being maximized for the multiple base stations.

In some embodiments, the reward function being maximized may include an estimated maximum minimum rate for multiple terminals associated with each of the multiple base stations.

In some embodiments, each of the multiple objective function results may include an estimated rate of the multiple base stations. Determining the operating set of scaled load estimates may be based at least in part on the estimated rate of the multiple base stations. The estimated rate may be based on an average terminal location for each of the multiple base stations.

In some embodiments, determining the multiple objective function results may further include allocating resources to the multiple base stations based on each of the multiple sets of scaled load estimates, as well as receiving feedback including rates achieved by each of the multiple base stations. The multiple objective function results may be based on a sum of the rates achieved by the multiple base stations. The reward function being maximized may include a maximum minimum rate for multiple terminals associated with each of the multiple base stations.

The method 400 may continue at block 406 by determining an operating set of PRBs for the multiple base stations based at least in part on the multiple objective function results.

In some embodiments, determining the operating set of PRBs may be based at least in part on at least one of: a noise level, a number of base stations, a distance between base stations, and a terminal density. Alternately or additionally, determining the operating set of PRBs may include identifying a relative optimal set of scaled load estimates associated with an optimal objective function result relative to the multiple objective function results according to an objective of a radio network.

One skilled in the art will appreciate that, for this and other processes and methods may be implemented in a differing order. Furthermore, the outlined steps and operations are only provided as examples, and some steps and operations may be optional, combined into fewer steps and operations, or expanded into additional steps and operations without detracting from the essence of the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of controlling radio resources comprising:
    calculating a plurality of sets of scaled load estimates based on a single set of initial load estimates associated with estimated radio resource loads of a plurality of base stations, each of the plurality of sets of scaled load estimates including the single set of initial load estimates scaled by a different scale factor of a plurality of scale factors;
    determining a plurality of objective function results, each objective function result of the plurality of objective function results based at least in part on a result of an objective function for an individual set of scaled load estimates of the plurality of scaled load estimates;
    determining an operating set of radio resources for the plurality of base stations based at least in part on the plurality of objective function results; and
    assigning radio resources to the plurality of base stations according to the operating set of radio resources, the assigned radio resources for the plurality of base stations to allocate to associated terminals for wireless communication.

2. The method of claim 1, wherein determining the operating set of radio resources is further based at least in part on at least one of: a noise level, a number of base stations, a distance between base stations, and a terminal density.

3. The method of claim 1, wherein determining the operating set of scaled load estimates includes identifying a relative optimal set of scaled load estimates associated with an optimal objective function result relative to the plurality of objective function results according to an objective of a telecommunication system.

4. The method of claim 3, wherein:
    the objective function includes a reward function, and
    the relative optimal set of scaled load estimates is further associated with the reward function being maximized for the plurality of base stations.

5. The method of claim 4, wherein the reward function being maximized includes an estimated maximum minimum rate for a plurality of terminals associated with the plurality of base stations.

6. The method of claim 3, wherein:
each of the plurality of objective function results includes an estimated rate of the plurality of base stations, and
determining the operating set of scaled load estimates is based at least in part on the estimated rate of the plurality of base stations.

7. The method of claim 6, wherein the estimated rate is based on an average terminal location for each of the plurality of base stations.

8. The method of claim 3, wherein:
determining the plurality of objective function results further includes:
allocating resources to the plurality of base stations based on each of the plurality of sets of scaled load estimates; and
receiving feedback including rates achieved by each base station of the plurality of base stations.

9. The method of claim 1, wherein the plurality of scale factors includes a plurality of nonzero scale factors.

10. The method of claim 1, wherein the plurality of scale factors includes a set of linearly incremented scale factors represented by $[1:\Delta:N]$, where $\Delta$ represents a step size and $N$ represents a maximum scale factor to be considered.

11. The method of claim 1, wherein the plurality of scale factors are generated according to a bisection method.

12. A central controller including a non-transitory computer-readable medium having encoded therein programming code executable by a processor to perform operations comprising:
calculating a plurality of sets of scaled load estimates based on a single set of initial load estimates associated with estimated radio resource loads of a plurality of base stations, each of the plurality of sets of scaled load estimates including the single set of initial load estimates scaled by a different scale factor of a plurality of scale factors;
determining a plurality of objective function results, each objective function result of the plurality of objective function results based at least in part on a result of an objective function for an individual set of scaled load estimates of the plurality of scaled load estimates;
determining an operating set of radio resources for the plurality of base stations based at least in part on the plurality of objective function results; and
assigning radio resources to the plurality of base stations according to the operating set of radio resources, the assigned radio resources for the plurality of base stations to allocate to associated terminals for wireless communication.

13. The central controller of claim 12, wherein determining the operating set of radio resources is further based at least in part on at least one of: a noise level, a number of base stations, a distance between base stations, and a terminal density.

14. The central controller of claim 12, wherein determining the operating set of scaled load estimates includes identifying a relative optimal set of scaled load estimates associated with an optimal objective function result relative to the plurality of objective function results according to an objective of a telecommunication system.

15. The central controller of claim 14, wherein:
the objective function includes a reward function, and
the relative optimal set of scaled load estimates is further associated with the reward function being maximized for the plurality of base stations.

16. The central controller of claim 15, wherein the reward function being maximized includes an estimated maximum throughput rate for a plurality of terminals associated with the plurality of base stations.

17. The central controller of claim 14, wherein:
each of the plurality of objective function results includes an estimated rate of the plurality of base stations, and
determining the operating set of scaled load estimates is based at least in part on the estimated rate of the plurality of base stations.

18. The central controller of claim 17, wherein the estimated rate is based on an average terminal location for each of the plurality of base stations.

19. The central controller of claim 14, further comprising:
determining the plurality of objective function results further includes:
allocating resources to the plurality of base stations based on each of the plurality of sets of scaled load estimates; and
receiving feedback including rates achieved by each base station of the plurality of base stations.

20. A method of adaptive graph coloring comprising:
receiving a set of initial load estimates associated with estimated radio resource loads of a plurality of base stations;
calculating a first set of scaled load estimates, the first set of scaled load estimates including the set of initial load estimates scaled by a first scale factor of a plurality of scale factors;
determining a first objective function result, the first objective function result based at least in part on a first result of an objective function for the first set of scaled load estimates;
calculating a second set of scaled load estimates, the second set of scaled load estimates including the set of initial load estimates scaled by a second scale factor of the plurality of scale factors;
determining a second objective function result, the second objective function result based at least in part on a second result of the objective function for the second set of scaled load estimates, wherein the second scale factor is different from the first scale factor;
determining an operating set of radio resources for the plurality of base stations based at least in part on the first objective function result and the second objective function result; and
assigning radio resources to the plurality of base stations according to the operating set of radio resources, the assigned radio resources for the plurality of base stations to allocate to associated terminals for wireless communication.

21. The method of claim 20, wherein the first objective function result includes a first sum rate of the plurality of base stations and the second objective function result includes a second sum rate of the plurality of base stations.

22. The method of claim 21, wherein the first sum rate and the second sum rate are estimated.

23. The method of claim 21, wherein the first sum rate and the second sum rate are received as feedback from the plurality of base stations.

* * * * *